US 6,907,096 B1

United States Patent
Lueker et al.

(10) Patent No.: US 6,907,096 B1
(45) Date of Patent: Jun. 14, 2005

(54) DATA RECOVERY METHOD AND APPARATUS

(75) Inventors: Jonathan C. Lueker, Portland, OR (US); Dean Warren, Carlton, OR (US); Kenneth B. Oliver, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 757 days.

(21) Appl. No.: 09/670,598

(22) Filed: Sep. 29, 2000

(51) Int. Cl.[7] .................................................. H04L 7/00
(52) U.S. Cl. ...................... 375/355; 375/335; 375/354; 375/240.28
(58) Field of Search ................................. 375/308, 296, 375/240.28, 100, 354, 216, 233, 377, 355, 316, 376, 326, 335, 340, 222, 232; 341/155, 101, 143, 110, 141, 100; 455/76, 3.01; 328/15; 348/465; 327/407, 293; 716/6; 370/409

(56) References Cited

U.S. PATENT DOCUMENTS

| | | | | |
|---|---|---|---|---|
| 4,764,940 A | * | 8/1988 | Paneth et al. ............... 375/308 |
| 5,119,093 A | * | 6/1992 | Vogt et al. ................... 341/123 |
| 5,225,787 A | * | 7/1993 | Therssen ..................... 327/113 |
| 5,617,088 A | * | 4/1997 | Yasuda ......................... 341/61 |
| 5,619,202 A | * | 4/1997 | Wilson et al. ............... 341/143 |
| 5,812,207 A | * | 9/1998 | Cahill, III .................... 348/465 |
| 6,107,946 A | * | 8/2000 | Jeong .......................... 341/101 |
| 6,560,278 B2 | * | 5/2003 | Kubo et al. .................. 375/232 |

OTHER PUBLICATIONS

An 800 Mbps multi–channel CMOS serial link with 3× oversampling Sungjoon Kim; Kyeongho Lee; Deog–Kyoon Jeong; Lee, D.D.; Nowatzyk, A.G.; Custom Integrated Circuits Conference, Proceedings of the IEEE 1995, May 1–4 1995.*
A 0.5–μm CMOS 4.0–Gbit/s Serial Link Transceiver with Data Recovery Using Oversampling/IEEE Journal of Solid–State Circuits, vol. 33, No. 5, May 1998.

* cited by examiner

Primary Examiner—Shuwang Liu
Assistant Examiner—Ted M Wang
(74) Attorney, Agent, or Firm—Kenyon & Kenyon

(57) ABSTRACT

In order to recover phase information, data transmitted at a first frequency is over-sampled using a clock at a second frequency, n times per bit time to obtain n samples. The n samples are used to detect the transitions between two logic levels in said transmitted data which are stored in groups of m sets of said n edge results which are, in turn output at a clock frequency which is the second frequency divided by m, for further processing.

24 Claims, 9 Drawing Sheets

DATA RECOVERY METHOD AND APPARATUS

FIELD OF THE INVENTION

Embodiments of the present invention relate to recovering clock and data information, from serial data.

BACKGROUND OF THE INVENTION

In some data communication arrangements, no separate clock signals are transmitted. This then requires recovering the clock at the receiving end in order to then recover the data. This can be characterized as the problem, in digital communications of, transferring digital signals between multiple clock timing domains. Multiple clock timing domains include the clock timing domain of a transmitting device as well as the clock timing domain of a receiving device. It is not unusual to transmit digital signals between clock timing domains having nearly the same underlying frequency clock, but different or varying phases with respect to each other.

One such arrangement is the Universal Serial Bus (USB). The USB is a bus having electrical, mechanical, and communication characteristics that follows a protocol defined in "Universal Serial Bus Specification" Revision 2.0 published Apr. 27, 2000, by Compaq Computer Corporation, Hewlett-Packard Company, Intel Corporation, Lucent Technologies Inc, Microsoft Corporation, NEC Corporation and Koninklijke Phillips Electronics N.V. The USB Specification provides a standardized approach for component interconnection and data transfer.

From the digital communications perspective, a USB transmitting device sends data in the form of packets over a USB cable to a USB receiving device with the clock signal of the transmitting device being used when encoding digital information. Packets include a defined sync field having multiple bits with a transition for each bit (i.e., from a logic 1 to a logic 0 or vis-versa), a payload with data information, and an end of packet field. As discussed below, the sync field with its transition for each bit, provides a rich set of edges for the USB receiver lock onto the phase and frequency of the USB transmitting device. The USB Specification does not allow for a separate clock signal to be transmitted and this makes it difficult for a USB receiving device to adequately recover the clock signal of the USB transmitting device.

Another problem encountered in digital communications using USB is latching data after an idle period. An idle period is a period of time in which no packets are sent. Once packets are transmitted after an idle state has occurred, the USB transmitter frequency is unknown or may have changed since the previous packets were sent. The USB receiver must be able to recover packets and quickly determine the incoming phase and frequency (i.e., the USB transmitter frequency) without any loss of information. When a packet comes in, the USB receiver has a very short period of time to lock onto the USB transmitter frequency. The shortest time being six bits of sync field, with six bits of sync field only being 12 nanoseconds.

A need, therefore, exists for a technique of transferring signals between multiple clock timing domains that reduces or addresses these problems.

DETAILED DESCRIPTION

Embodiments of methods and systems for synchronizing data are described. In the following description, for purposes of explanation, numerous specific details are set forth to provide a thorough understanding of the present invention. It will be appreciated, however, by one skilled in the art, that the present invention may be practiced without these specific details. In other instances, structures and devices are shown in block diagram form. Furthermore, one skilled in the art can readily appreciate that the specific sequence in which methods are presented and performed are illustrative and it is contemplated that the sequences can be varied and still remain within the spirit and scope of the present invention.

Figure 1:
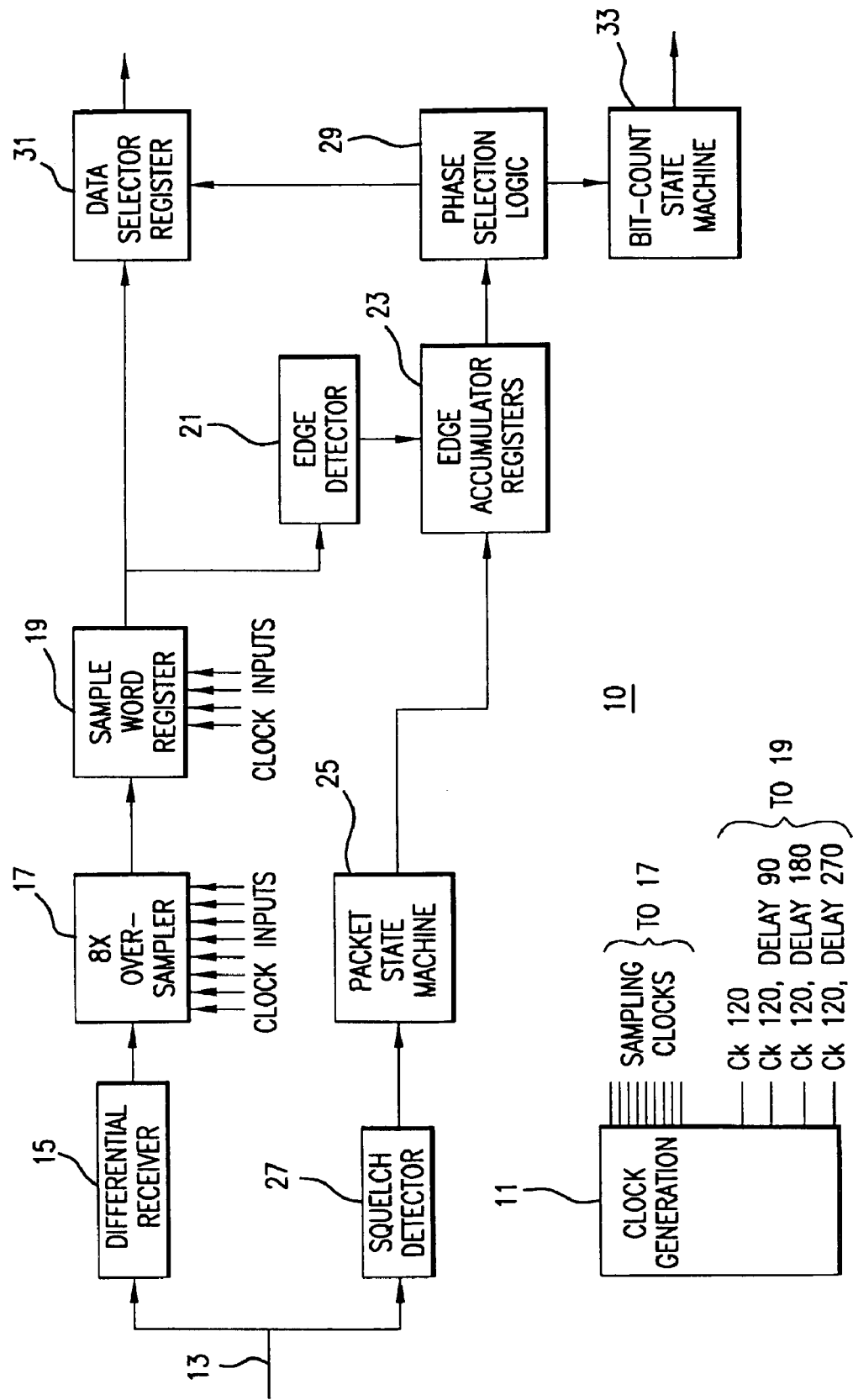
FIG. 1 is a block diagram of a receiver for receiving digital data signals in accordance with an embodiment of the present invention.

FIG. 1 is a block diagram of a receiver 10 for receiving digital data signals in accordance with an embodiment of the present invention. As an example, the receiver may comprise a Universal Serial Bus (USB) receiver. However, the method and apparatus of the present invention is applicable to data receivers in which synchronization for data recovery must be performed, in general. As discussed above, in USB signaling, there is no separate clock signal sent over USB cable. There are no unique symbols reserved for start of packet delimiting. Data is sent at a frequency of 480 Mb/s with a tolerance of +/−500 parts per million (ppm).

Between packets, the USB signaling levels on the line go to what is called the idle state. When in the idle state, the lines are both nominally at ground so the differential voltage remains steadily at zero. When signaling in a high speed mode, one of the USB lines is driven nominally 400 mV while the other remains at ground. Which of the two lines is high determines whether a 1 or a 0 is being sent. Thus, when in the idle state, the differential lines voltage is zero, and when driven, the differential line voltage is +/−400 mV.

The receiver of FIG. 1 includes a clock generator 11. The clock generator 11 operates at a clock frequency equal to that of the transmitter from which the data is received within a predetermined tolerance. For example, in the USB this is 480 Mb/s with a tolerance of +/−500 parts per million (ppm), just like the transmitted data. However, the relationship between the phase of the clock and the data being received is unknown. In order to recover the data, this relationship must be determined. Note that when the transmit and receive clock tolerances are combined, the total potential error is the sum of the two, e.g., in USB it can be ±1000 ppm.

In the illustrated embodiment, the incoming signal on line 13 is coupled into a differential receiver 15. As noted, in a USB system, the nature of the signal is that it is a differential transmission in which one of the lines is high for a logic 1 and the other high for a logic 0. The output of the differential receiver will be a bit stream at the frequency of the transmitter, e.g., 480 MHz. The incoming bit stream is illustrated as timing signal 16 in FIG. 2. As noted above, incoming packets include a sync field having multiple bits with a transition for each bit (i.e., from a logic 1 to a logic 0 or vis-versa) and a payload with data information. What is shown as timing signal 16 represents the sync field where transitions occur for each bit. For data transition is considered to be the case when two adjacent bits do not have the same value.

In the illustrated embodiment, this bit stream is over-sampled by an eight times oversampler 17. Although an eight times over-sampler circuit is shown, any modulus of over-sampler, e.g., 5, can be used without departing from the spirit and scope of the present invention. More generally, what occurs is that data transmitted at a first frequency is over-sampled using an effective clock at a second frequency, n times the receiver clock. In the example, n is eight but could also be some other number. This produces nominally n samples per bit time (also referred to as a unit interval), where n is an integer greater than one.

Figure 2:
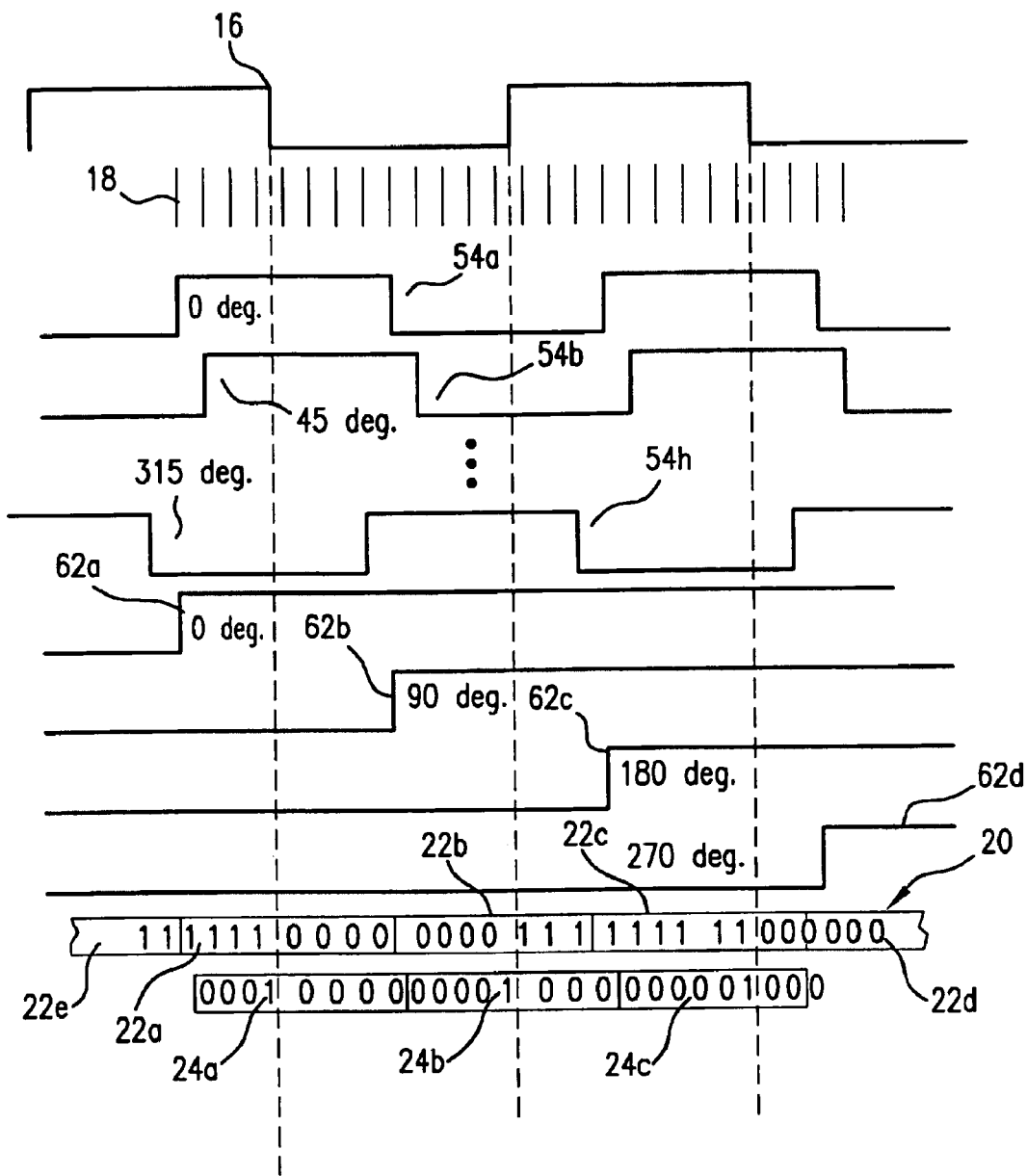
FIG. 2 is a timing diagram for various input and output signals of system components in the embodiment shown in FIG. 1.

As shown in FIG. 2, by the vertical lines 18, in the illustrated embodiment, eight samples extend over a bit time and normally include, at most, a single transition. In other words, a group of the samples will have a logic 1 level and following the transition, a group will have a logic 0 level as indicated by the series of 1s and 0s indicated as 20 on FIG. 2 where boxes are drawn around the groups of eight samples 22*a*–*d*. By detecting where that change takes place, it is possible to determine the transition location. Knowing the transition location, a point farthest from the transition can be selected as the point to sample data.

As will be explained in more detail below, in the illustrative embodiment, over-sampler 17 provides n outputs, where n=8, e.g., one of the groups 22*a*–*d* of eight in FIG. 2, corresponding to the eight samples. These are inputs to a sample word register 19. The sample word register 19 stores m, where, in the illustrated embodiment, m=4, successive groups of eight outputs from the oversampler 17 and outputs them as an (m×n)-bit word at a frequency 1/m that of the data frequency. In the illustrated embodiment, the word is a 32 bit word. (Actually, 40 bits are output, the additional eight bits constituting a duplicate of the oldest eight bit sample). This permits the remainder of the processing to be carried out at this lower frequency greatly reducing the demands placed on the hardware. Again m=4 is only an example and m may be of some other value, i.e. m is an integer greater than 1.

The output from the sample word register to 19, which, in the example shown, comprises 40 samples, is applied to an edge detector 21. Edge detector 21 looks at pairs of these inputs utilizing exclusive or (XOR) gates and thereby determines that which points transitions take place. These outputs of the XOR gates are illustrated as 24*a*–24*c* of FIG. 2. The outputs of the edge detector are inputs to edge accumulation latches 23. The outputs of the edge detector will indicate, for five sets of samples at a time, between which of the eight samples a transition took place. Corresponding sample positions in each of the five sets are combined and the results latched. To get a running history, a number of latches are utilized. The edge accumulation registers 23 also receive an input from a packet state machine 20 which in turn receives an input from a squelch detector 27 having as its input the incoming signal line 13. machine 20 which in turn receives an input from a squelch detector 27 having as its input the incoming signal line 13.

The purpose of the squelch detector, in this particular embodiment, is to determine the beginning of the transmission of a packet of data. It senses whether or not there is a signal on either of the differential lines. If no data is being transmitted, both lines will be at ground. The packet state machine is utilized to provide the necessary control signals, for example, to the edge accumulation latches 23, to insure they are reset as necessary to maintain an accurate history.

The output of the edge accumulation latches is provided as an input to phase selection logic 29. In a manner to be described below, in the illustrative embodiment, the phase selection logic 29 selects, as the desired phase, the phase that is the greatest distance from the transitions. In other words, it is desired to select a phase for sampling data that is as close to the middle of the bit time as possible. The determined phase is output to the data selection register which uses it to select the data sample at that phase for each bit. The data selection register obtains the data from the sample word register 19.

The phase selection logic 29 also provides an output to a bit count state machine 33. Normally, in the illustrative embodiment, the data selection register outputs four valid bits. However, because of the tolerance on the frequency of the transmitter clock and receiver clock, it is possible that the phase will drift. This may take place in either direction. As a result, in some cases the data selection register will output only three valid bits and in other cases it may output five valid bits. The bit count state machine provides an indication of the number of valid bits being output by the data selection register 31.

Figure 3:
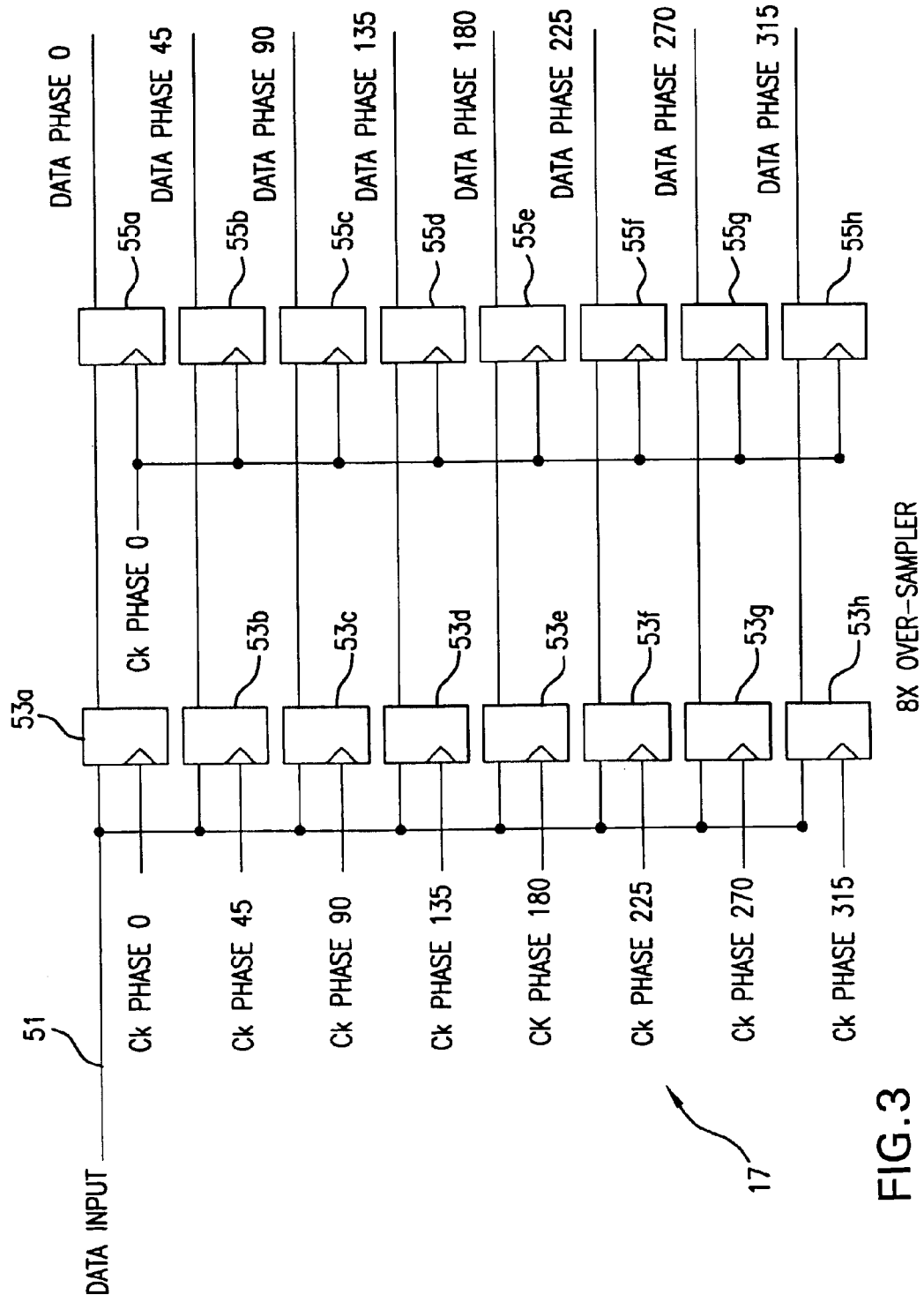
FIG. 3 is a block/logic diagram of an embodiment of the oversampler of FIG. 1.

FIG. 3 is a diagram of an embodiment of an over-sampler 17 which may be used in embodiments of the present invention. Serial data on line 51 is input to the data input of, for example, D-type flip flops 53*a* through 53*h*. Each of these is clocked by a clock signal from the clock generator 11 of FIG. 1 at the bit frequency. However, each is at a different phase. Thus, for example, flip flop 53*a* is clocked at zero phase, 53*b* at a phase of 45 degrees, 53*c* at a phase of 90 degrees, and so on, each phase being shifted 45 degrees from the adjacent phase. These clock phases are shown as 54*a* (0 deg.), 54*b* (45 deg.) and 54*h* (315 deg.) on FIG. 2. In between clock 54*b* and clock 54*h* are additional clocks for the intervening phases. The lines 18 of FIG. 2 correspond to the leading edges of these eight clock signals.

After going through the eight phases, with eight samples at the outputs of the eight flip flops 53*a* through 53*h*, these outputs are latched in another set of eight flip flops 55*a* through 55*h* by the zero phase clock. The resulting output comprises eight data signals representative of the logic level of the data at each of the eight sampling phases as shown, for example by group 22*a* of FIG. 2.

Figure 4:
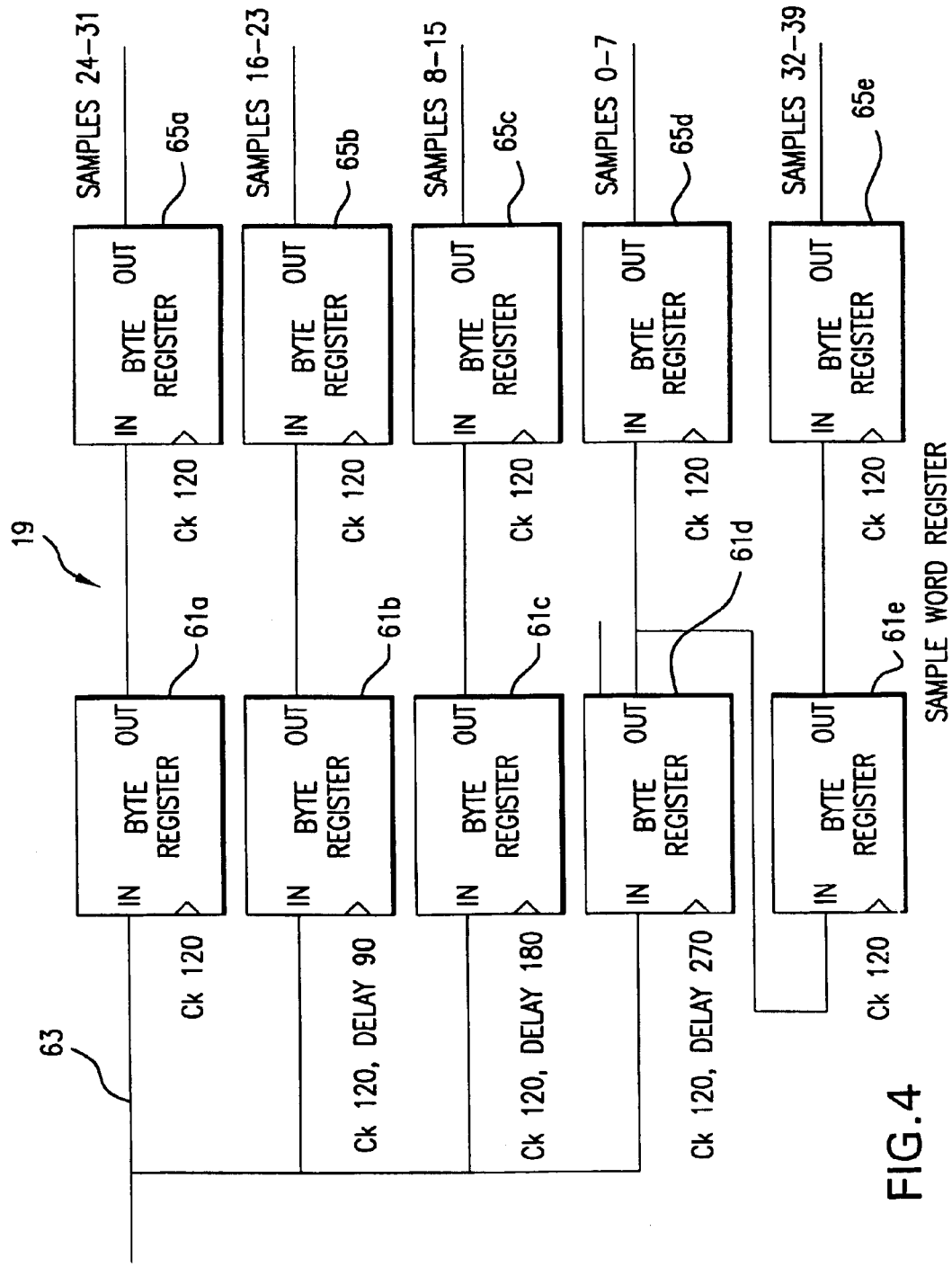
FIG. 4 is a block/logic diagram of an embodiment of the sample word register of FIG. 1.

FIG. 4 is a diagram of an exemplary embodiment of sample word register 19 of FIG. 1. The input to this unit comprises the eight lines output by the over-sampler 17. These eight lines are coupled as inputs to each of four byte registers 61*a*–61*d*. The clock generator 11 of FIG. 1, in addition to generating the eight phases at the data rate, for example, 480 MHZ, also generates 4 clocks at 120 MHz. These are shown as 62*a*–62*d* in FIG. 2. Although at the same frequency, these clocks are delayed by different amounts. The first clock 62*a* has no delay, the second 62*b*, a delay of 90 degrees, the third 62*c*, a delay of 180 degrees and the fourth 62*d*, a delay of 270 degrees. As can be seen from FIG. 2, this results in clock edges which effectively, when taken as a group, occur at a 480 MHz rate. Thus, after the data has been latched into the eight latches 55*a*–55*h* of FIG. 3, which data appears on line 63, a 120 MHz clock 62*a* transition will clock that data into byte register 61*a*. Then, eight more samples of data are obtained for the next data bit. This signal on line 63 is then clocked into byte register 61*b* by the 120 MHz clock 62*b* delayed by 90 degrees. Similarly, the next two sets of samples are clocked into byte registers 61*c* and 61*d* by clock 62*c* and 62*d*. The output of byte register 61*d* is provided as an input to a byte register 61*e*. This byte register is also clocked by the 120 MHz clock at zero phase. As a result, when the data is clocked into byte register 61*a*, at the same time, the data which had previously been stored into byte register 61*d* is clocked into byte register 61*e*. Subsequently, the data at the output of byte registers 61*a*–61*e* is clocked into a set of byte registers 65*a*–65*e*.

The result at the output of byte registers 65*a*–65*e*, which is the output of the sample word register 19, in the present example, is a set of 40 samples. 32 of the samples represent eight samples for each of four successive data bits, with the remaining eight being the last eight bits from the previous 32 samples. In other words, all of the samples 22*a*–22*d*, along with a previous eight samples 22*e* will be output at the same time. As noted above, this output is provided to the edge detector.

Figure 5:
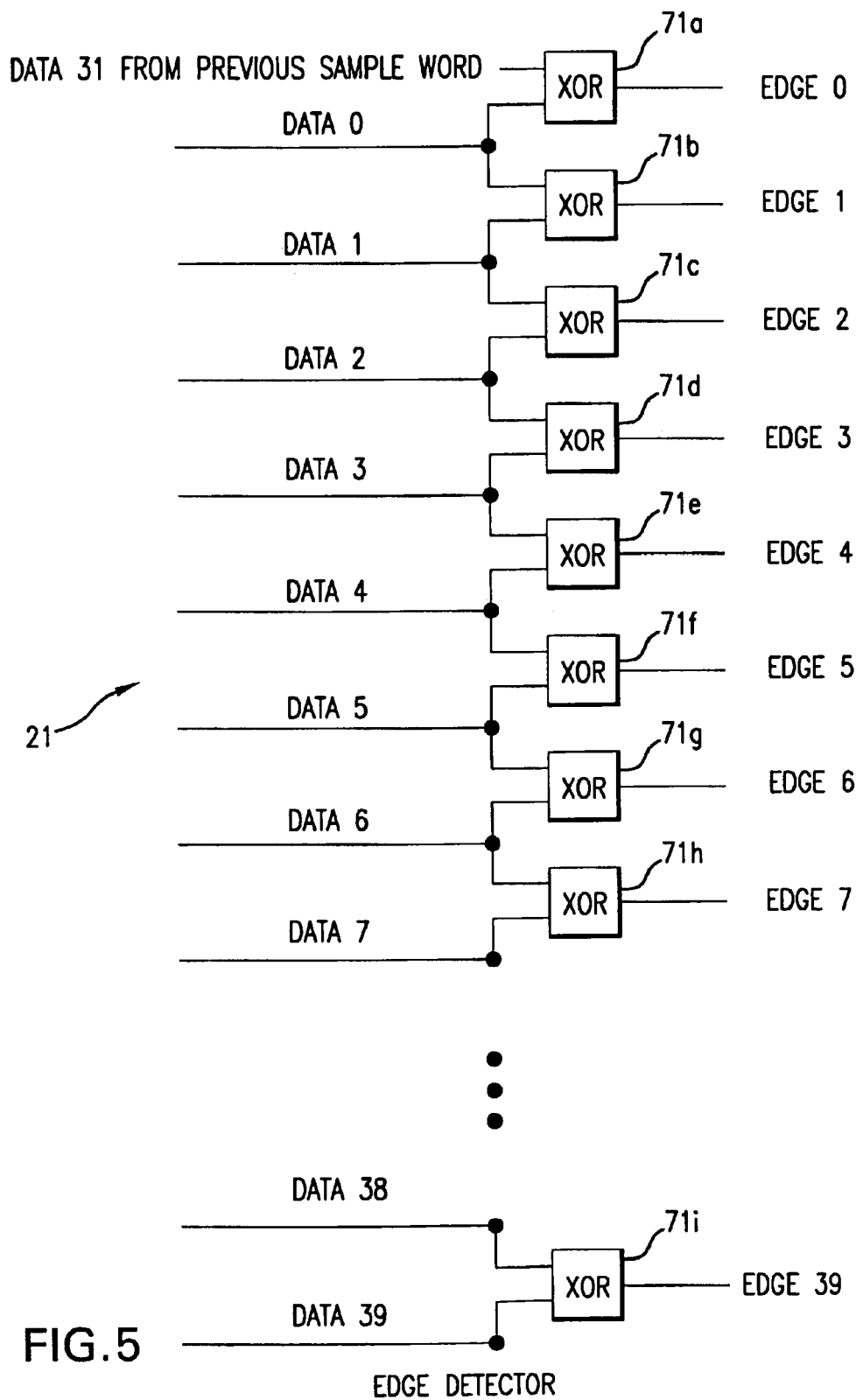
FIG. 5 is a block/logic diagram of an embodiment of the edge detector of FIG. 1.

An embodiment of an edge detector 21 which can be used in the embodiment of FIG. 1 is illustrated in FIG. 5. The edge detector comprises a plurality of 40 XOR gates 71. Only the gates for edges 0–7 and 39 are illustrated. It will be understood that between the gate for edge 7 and edge 39, gates for edges 8–38 will be provided. XOR gate 71*a* has as its inputs data 0 and data 31 from the previous sample word. Similarly, gate 71*b* has as inputs data 0 and data 1. In similar fashion, adjacent data lines provide the inputs to the remaining XOR gates. Since an XOR gate provides a logic one output only in the case where only one of its inputs is a logic one, an output will occur only where there is a transition between the two data inputs. That is, an output will occur only when one of the inputs is at a logic zero level and the other at a logic one level indicating a change.

Figure 6:
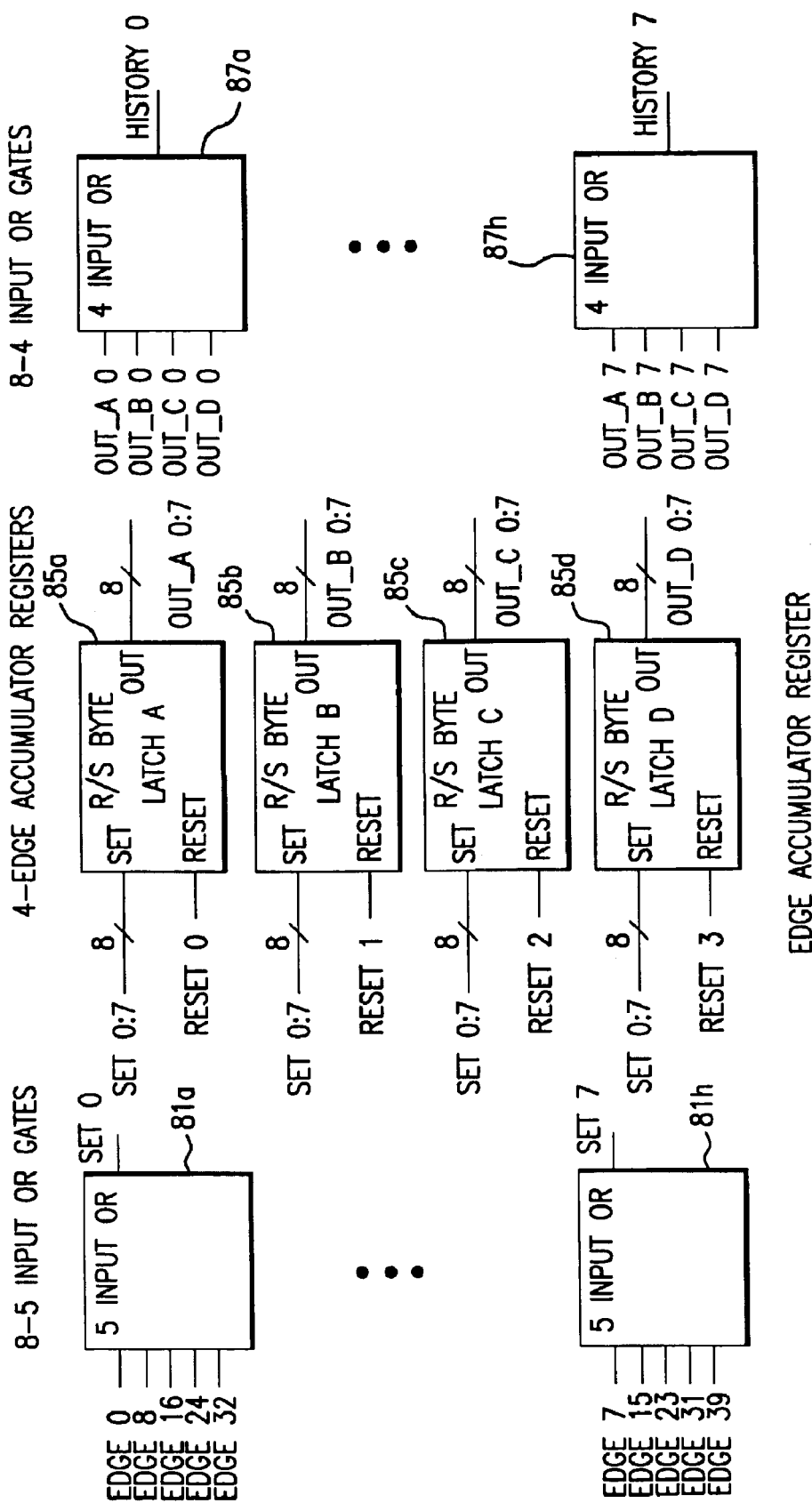
FIG. 6 is a block/logic diagram of an embodiment of the edge accumulation latches of FIG. 1.

FIG. 6 shows an exemplary embodiment of the edge accumulation registers of FIG. 1. The edge outputs of the embodiment of the edge detector of FIG. 5 provide inputs to the edge accumulation register of FIG. 6. The 40 edge outputs comprise five groups of eight outputs. Three of these groups are shown as 24*a*–24*c* in FIG. 2. The relative positions of edge 0 in the first group 24*a* is the same as that of edge 8 in the second group 24*b*, edge 16 in the third group 24*c*, edge 24 in the fourth group and edge 32 in the fifth group. Thus, in the edge accumulation register unit 8, OR gates 81*a*–81*h* are provided, one for each of the eight possible edge positions within a bit time. In FIG. 6, only gate 81*a*, corresponding to the first edge position, and gate 81*h*, corresponding to the last edge position are illustrated. In between will be six more such gates.

A particular OR gate will have an output if any of its inputs is at a logic one level. Thus, if in any of the five groups of edges, the first edge position, i.e., 0, 8, 16, 24 or 32 is at logic 1, the gate wilt have an output indicating a transition at the first edge position. In the example illustrated, where the difference in frequency between data 16 and the clocks 54*a*–54*h* has been exaggerated, position 3 in the first group 24*a* has a transition, position 12 in the second group 24*b* has a transition and position 21 in the third group 24*c* has a transition. Thus, gates 8*d, e* and *f* will all have outputs at a logic one. Some of the remaining gates may also have outputs due to the inputs not shown.

The outputs of the 8 gates 81*a*–81*h* are inputs to each of four byte latches 85*a*–85*d*. These are essentially set-reset latches with the outputs of the OR gates 81*a*–81*h* setting the latches. Although indicated as a single latch, each of latches 85*a*–85*d* actually comprises 8 latches, one coupled to each of the OR gate 81*a*–81*h* outputs. Thus, in the example given, at least the three latches at positions 3, 4 and 5 would be set.

When the beginning of a packet is detected, all of the byte latches 85*a*–85*d* are reset and begin accumulating data. Initially, all of the byte latches 85*a*–85*d* will contain the same information. That is, the position connected with a detected edge transition(s), e.g. 3, 4 and 5 will be set in each. More than-one may be set, for example, due to jitter. In any case, as time passes, if, for example, the clock frequencies differ, the edge location will drift and be at a different location. The exaggerated offset in clock frequency introduced into FIG. 2 has the effect of showing what happens over time with drift. Then multiple outputs from the byte register will be at a logical 1 level as was seen above. Eventually, all edges will be high and it becomes impossible to select the location which is furthest away from the transitions.

Thus, the latches are reset on rolling basis, under control of the packet state machine 25. For example if latch 85*a* is reset, it will then begin to accumulate only the most recent information. If, in succession, latch 85*b*, then 85*c* and then 85*d* are reset, latch 85*d* will have the oldest information 85*a* next oldest and so on. Thus, a rolling history of edge transitions is maintained. The outputs of the latches, of which there will be eight for each of latches 85*a*–85*d*, are provided into a set of 8 OR gates 87*a*–8*h*. These OR gates then provide a historical indication of edge transitions.

Figure 7:
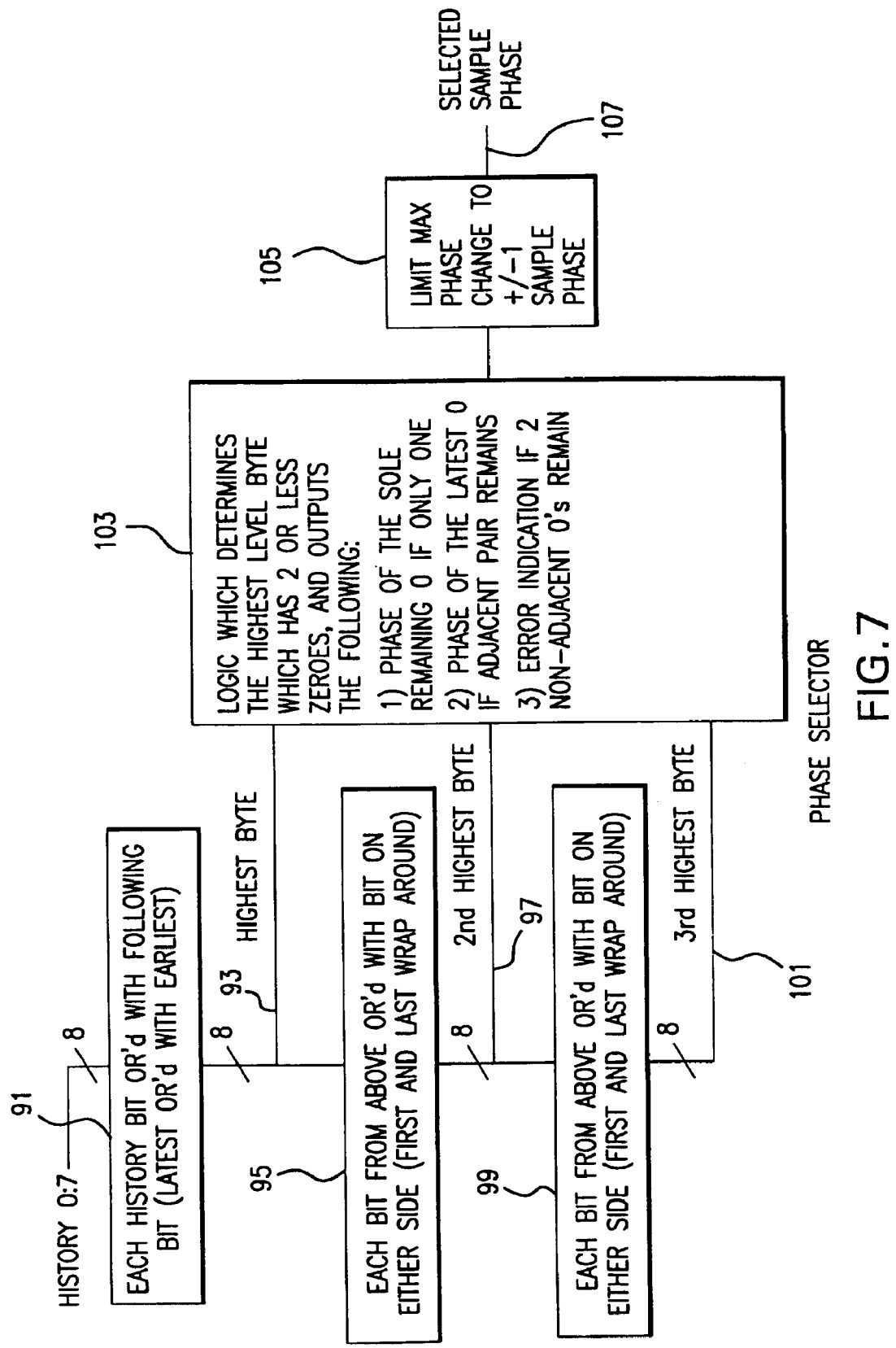
FIG. 7 is a flow diagram of an embodiment of phase selection logic of FIG. 1.

FIG. 7 is a flow diagram of an embodiment of phase selection logic of FIG. 1. The outputs of the OR gates 87*a*–87*h* are combined such that each of the history bits is Ored with the following bit as indicated in block 91. As also indicated, the latest is Ored with the earliest. This will result in 8 outputs. These 8 outputs form the highest byte on line 93. The 8 bit outputs on line 93 are again Ored, in a further 8 Or operations. As indicated in block 95, each of the 8 outputs on line 93 is Ored with the bit on either side. The first and last bits wrap around. The output on line 97 from the Oring function in block 95 is the second highest byte. The 8 outputs from block 95 are provided to another block 99 where another 8 OR operations take place. This is carried out in the same manner as in block 95. The resulting output on line 101 line is the third highest byte.

The highest byte, second highest byte and third highest byte are inputs to logic 103. As indicated, this logic determines the highest level byte which has two or fewer zeros. As indicated, it outputs the phase of the sole remaining 0 if there is only one 0 remaining. It outputs the phase of the latest 0 if only an adjacent pair remains. It outputs an error indication if 2 non-adjacent zeros remain. The output from logic 103 is an input to block 105. Block 105 limits the maximum phase change to plus or minus one sample phase per iteration. The output of block 105 on line 107 will be the selected sample phase. That is to say, it will be one of the phases 54*a*–54*h* of FIG. 2.

Figure 8:
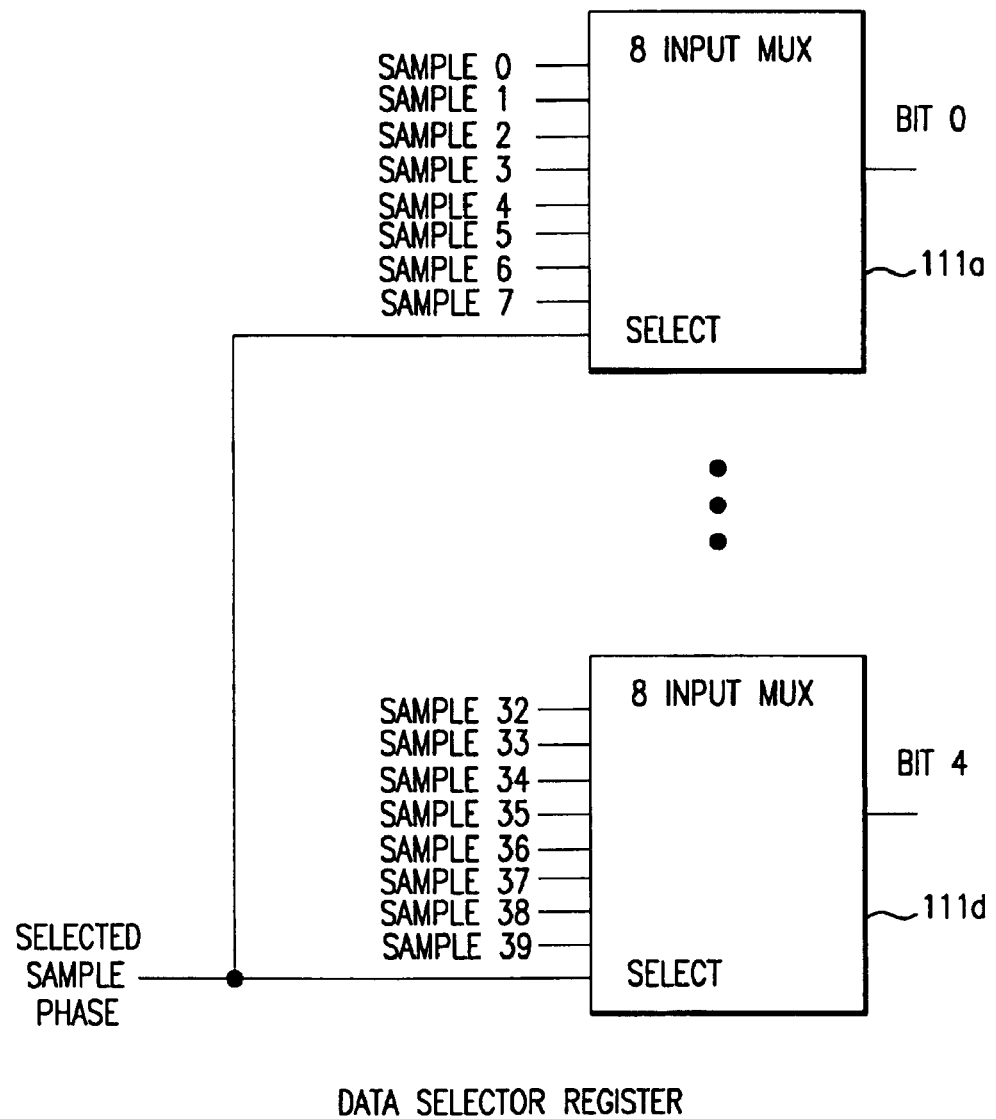
FIG. 8 is a block/logic diagram of an embodiment of the data selector register of FIG. 1.

FIG. 8 is a block/logic diagram of an embodiment of the data selector register of FIG. 1. This embodiment of the data selector register comprises four 8-input multiplexers 111*a* to 111*d*, of which only the first and last are shown. These receive inputs from the byte registers 65*a*–65*e* of FIG. 4. In addition, they receive a select input from line 107 of FIG. 7. This will be a three bit signal permitting selection of one of the 8 sample inputs to each of the multiplexers 111*a*–111*d*.

Figure 9:
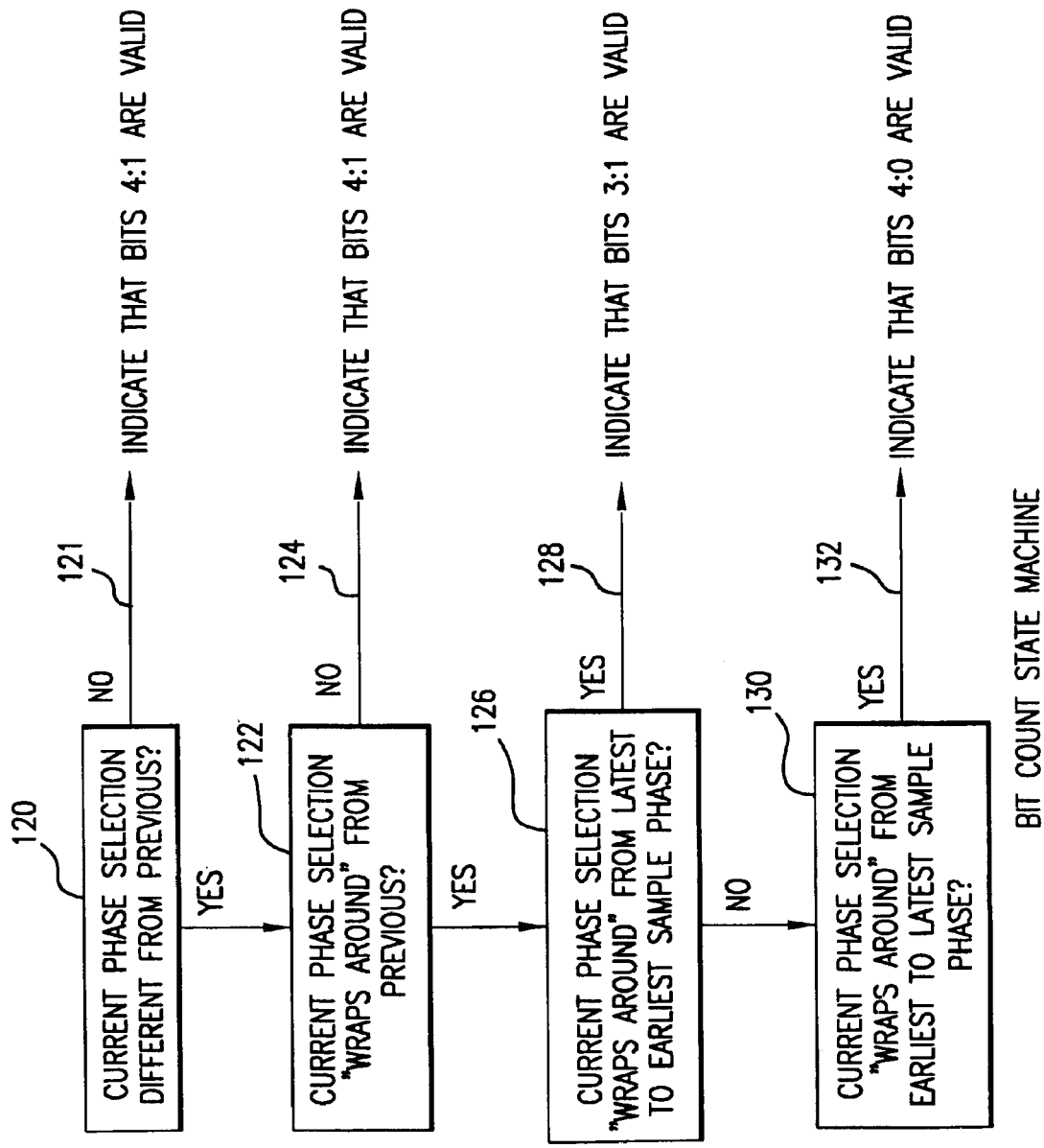
FIG. 9 is a flow diagram of an embodiment of bit count state machine of FIG. 1.

FIG. 9 is a flow diagram of an embodiment of the bit count state machine of FIG. 1. In block 120, a comparison is made to see if the current phase selection is different from the previous phase selection. If it is not, then the four bits 4:1 are valid and an appropriate indication is provided on line 121. If the current phase selection is different, block 122 is entered. Here, a check is made to see whether the current phase selection "wraps around" from the previous phase. If it does not, then four bits 4:1 are valid and an appropriate indication is provided on line 124.

If the phase did wrap around, then the answer from block 122 is "yes" and block 126 is entered. Here a check is made to see if the current phase selection "wraps around" from the latest to the earliest sample phase. If so, then the three bits 3:1 are valid and this is indicated on line 128. If not, block 130 is entered at a check made to see if the current phase selection "wraps around" from the earliest to latest sample phase. If it does, an output on line 132 indicates that the five bits 4:0 are valid.

Thus, the final outputs of the data selector register in bit count state machine of FIG. 1, provides 5 bits of output data and an indication of which of those bits are valid. This information can then be subsequently used by other circuits.

Embodiments of methods and apparatus for clock and data recovery have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, apparatus and methods in accordance with embodiments of the present invention have been described with reference to specific exemplary embodiments. Accordingly, the present specification and figures are to be regarded as illustrative rather than restrictive.

What is claimed is:

1. A method for recovering phase information comprising:
    over-sampling data transmitted at a first frequency using a clock at a second frequency to obtain groups of n samples, where n is an integer greater than one;
    storing a plurality of m of said groups of n samples, where m is an integer greater than one;
    outputting said plurality of m of said groups of n samples simultaneously at a clock frequency which is said second frequency divided by m.

2. A method according to claim 1 and further including:
    using said plurality of m of said groups of n samples to detect transitions in said data; and
    maintaining an historical record of said transitions.

3. A method according to claim 2 and further including:
    using said historical record to determine a phase of said second frequency that is nearly centered in the middle of a bit time of said data at said first frequency.

4. A method according to claim 3 wherein said step of determining a phase comprises:
    a. Oring each history bit with the following bit to obtain a highest byte;
    b. Oring each bit in said highest byte with a bit on either side to obtain a second highest byte;
    c. Oring each bit in said second highest byte with a bit on either side to obtain a third highest byte; and
    d. determining the highest level byte which has two or fewer zeros and outputting:
        i. the phase of the sole remaining zero if there is only one zero;
        ii. the phase of the latest zero if an adjacent pair remains;
        iii. an error indication if two non-adjacent zeros remain.

5. A method according to claim 4 and further including limiting the maximum phase change to plus or minus one sample phase.

6. A method according to claim 3 and further including:
    using said historical record to select bits of said data at said first frequency and output said bits in groups of generally m valid bits at a time at said second frequency divided by m.

7. A method according to claim 6 wherein, due to the difference in said first and second frequency a draft occurs causing said phase to select m+1 or m−1 bits of data and further including:
    outputting either m, m+1 or m−1 valid bits; and
    using said historical record to provide an indication of how many bits are being output.

8. A method according to claim 7 wherein said step of providing an indication of how many valid bits are being output comprises:
    a. determining whether the current phase selection is different from the previous phase selection and if not, indicating that bits m:1 are valid;
    b. if the current phase selection is different from the previous phase selection, determining if the current phase selection wraps around from the previous phase selection and if not, indicating that bits m:1 are valid;
    c. if the current phase selection wraps around from the previous phase selection determining if it wraps around from the latest to earliest sample phase, and, if so, indicating that bits (m−1):1 are valid; and
    d. if the current phase selection wraps around from the previous phase selection determining if it wraps around from the earliest to latest sample phase, and, if so, indicating that bits m:0 are valid.

9. A method for recovering phase information comprising:
    over-sampling data transmitted at a first frequency using a clock at a second frequency, n times per bit time to obtain n samples, where n is an integer greater than one;
    using said n samples to detect the transitions between two logic levels in said transmitted data and provide n edge results which are at one logic level to indicate a transition and the other logic level to indicate no transition;
    storing, in sequence, at said second clock frequency, m sets of said n samples, where m is an integer greater than one; and
    outputting said m times n samples at a clock frequency which is said second frequency divided by m.

10. A method according to claim 9 and further including maintaining a running history of said edge results comprising:
    combining in n separate m input OR gates the m times n samples, each gate having as inputs the m of said samples in the same relative position in each of said m sets;
    using the outputs of said n OR gates to set p sets of byte registers, each having n registers; and
    resetting said p byte registers in a wrap around sequence.

11. A method according to claim 10 and further including:
using outputs of said byte registers to determine a phase of said second frequency that is nearly centered in the middle of a bit time of said data at said first frequency.

12. A method according to claim 11 wherein said step of determining a phase comprises:
 a. Oring each history bit with the following bit to obtain a highest byte;
 b. Oring each bit in said highest byte with a bit on either side to obtain a second highest byte;
 c. Oring each bit in said second highest byte with a bit on either side to obtain a third highest byte; and
 d. determining the highest level byte which has two or fewer zeros and outputting:
  i. the phase of the sole remaining zero if there is only one zero;
  ii. the phase of the latest zero if an adjacent pair remains;
  iii. an error indication if two non-adjacent zeros remain.

13. A method according to claim 12 and further including limiting the maximum phase change to plus or minus one sample phase.

14. A method according to claim 13 and further including:
using said phase to select bits of said data at said first frequency and output said bits in groups of generally m at a time at said second frequency divided by m.

15. A method according to claim 14 wherein, due to the difference in said first and second frequency a drift occurs causing said phase to select m+1 or m−1 bits of data and further including:
outputting either m, m+1 or m−1 bits; and
using said phase information to provide an indication of how many bits are being output.

16. A method according to claim 15 wherein said step of providing an indication of how many bits are being output comprises:
 a. determining whether the current phase selection is different from the previous phase selection and if not, indicating that bits m:1 are valid;
 b. if the current phase selection is different from the previous phase selection, determining if the current phase selection wraps around from the previous phase selection and if not, indicating that bits m:1 are valid;
 c. if the current phase selection wraps around from the previous phase selection determining if it wraps around from the latest to earliest sample phase, and, if so, indicating that bits m−1:1 are valid; and
 d. if the current phase selection wraps around from the previous phase selection determining if it wraps around from the earliest to latest sample phase, and, if so, indicating that bits m:0 are valid.

17. Apparatus for recovering phase information comprising:
an over-sampler having an input for data transmitted at a first frequency and n sampling clock inputs each at a second frequency but different phase each clock shifted in phase from an adjacent clock by 360/n degrees and providing n sample outputs, where n is an integer greater than 1; and
a sample word register having inputs coupled to said n sample outputs, storing m sets of said n sample outputs at said second frequency and outputting said m sets of n sample outputs at a frequency equal to said frequency divided by m, where n is an integer greater than 1.

18. Apparatus according to claim 17 and further including an edge detector using said m sets of n sample outputs to detect the transitions between two logic levels in said transmitted data and provide m sets of n edge results which are at one logic level to indicate a transition and another logic level to indicate no transition.

19. Apparatus according to claim 18 wherein said edge detectors comprise a plurality of XOR gates.

20. Apparatus according to claim 19 and further including:
n separate m input OR gates, each gate having as inputs the m of said n edge results in the same relative position in each of said m sets of n edge results; and
p sets of n-bit byte registers, the outputs of each of said n OR gates being a set input to one of the n bits in each of said p byte registers.

21. Apparatus according to claim 20 and further including a packet state machine providing reset inputs to said byte registers.

22. Apparatus according to claim 21 and further including:
phase selection logic having the outputs of said byte registers as inputs and outputting a signal indicating a phase of said second frequency that is nearly centered in the middle of a bit time of said data at said first frequency.

23. Apparatus according to claim 22 and further including:
a data selector register having a data input from said sample register and the output of said phase selection logic as a select input to select bits of said data at said first frequency and output said bits in groups of generally m valid bits at a time at said second frequency divided by m.

24. Apparatus according to claim 23 wherein due to the difference in said first and second frequency a drift occurs casing said data selector register to output m+1 or m−1 valid bits of data and further including:
a bit count state machine providing as an output an indication of how many valid bits are being output by said data selector register.

* * * * *

UNITED STATES PATENT AND TRADEMARK OFFICE
CERTIFICATE OF CORRECTION

PATENT NO. : 6,907,096 B1
DATED : June 14, 2005
INVENTOR(S) : Jonathan C. Lueker et al.

It is certified that error appears in the above-identified patent and that said Letters Patent is hereby corrected as shown below:

Column 9,
Line 45, "bits m:1 are valid," should be -- bits m:1 are valid; --.

Signed and Sealed this

First Day of November, 2005

JON W. DUDAS
*Director of the United States Patent and Trademark Office*